US011308205B2

(12) United States Patent
Koshti et al.

(10) Patent No.: US 11,308,205 B2
(45) Date of Patent: Apr. 19, 2022

(54) SECURITY TOOL FOR PREVENTING INTERNAL DATA BREACHES

(71) Applicant: Bank of America Corporation, Charlotte, NC (US)

(72) Inventors: Prakash Koshti, Hyderabad (IN); Manan Rastogi, Hyderabad (IN); Ravi Shankar Penjendra, Hyderabad (IN)

(73) Assignee: Bank of America Corporation, Charlotte, NC (US)

(*) Notice: Subject to any disclaimer, the term of this patent is extended or adjusted under 35 U.S.C. 154(b) by 418 days.

(21) Appl. No.: 16/685,502

(22) Filed: Nov. 15, 2019

(65) Prior Publication Data

US 2021/0150024 A1 May 20, 2021

(51) Int. Cl.
*G06F 21/55* (2013.01)
*G06F 16/28* (2019.01)

(52) U.S. Cl.
CPC .......... *G06F 21/552* (2013.01); *G06F 16/285* (2019.01); *G06F 2221/033* (2013.01)

(58) Field of Classification Search
CPC ................ G06F 21/552; G06F 16/285; G06F 2221/033; G06F 16/24535; G06F 21/577
See application file for complete search history.

(56) References Cited

U.S. PATENT DOCUMENTS

| 7,434,011 | B2 | 10/2008 | Shue |
| 7,542,567 | B2 | 6/2009 | Torla et al. |
| 8,626,671 | B2 | 1/2014 | Federgreen |
| 9,032,531 | B1 | 5/2015 | Scorvo et al. |
| 9,460,593 | B2 | 10/2016 | Acosta |
| 9,762,599 | B2 | 9/2017 | Wager et al. |
| 10,142,364 | B2 * | 11/2018 | Baukes ............... H04L 63/1408 |
| 10,275,613 | B1 | 4/2019 | Olenoski et al. |
| 10,282,692 | B2 | 5/2019 | Barday et al. |
| 10,290,001 | B2 | 5/2019 | Adjaoute |
| 10,291,657 | B2 | 5/2019 | Narayanaswamy et al. |
| 10,341,366 | B2 | 7/2019 | Boss et al. |
| 10,438,001 | B1 | 10/2019 | Hariprasad |
| 10,467,426 | B1 | 11/2019 | Exposito et al. |
| 10,721,236 | B1 * | 7/2020 | Kronrod ............... H04L 63/102 |
| 2009/0094193 | A1 * | 4/2009 | King ................... G06F 21/6227 |
| 2010/0010968 | A1 | 1/2010 | Redlich et al. |
| 2011/0093925 | A1 * | 4/2011 | Krishnamoorthy ......................... G06F 21/6218 711/E12.001 |
| 2011/0289588 | A1 | 11/2011 | Sahai et al. |
| 2013/0133026 | A1 | 5/2013 | Burgess |
| 2013/0179982 | A1 | 7/2013 | Bridges et al. |
| 2013/0262328 | A1 | 10/2013 | Federgreen |

(Continued)

*Primary Examiner* — Meng Li

(57) ABSTRACT

A security tool analyzes database queries of internal users to determine if these users accessed information in a manner that deviates from established and/or expected access patterns. The security tool can also analyze the behavior of a group of internal users to determine whether that behavior deviates from expected access patterns. The security tool then determines security risks corresponding to the users' access. If any of the security risks exceeds a threshold, then the security tool takes remedial action (e.g., preventing one or more users from accessing information). In this manner, internal data breaches can be detected and prevented. Additionally, in certain embodiments, an internal data breach can be prevented before the internal data breach even occurs.

20 Claims, 3 Drawing Sheets

(56) References Cited

U.S. PATENT DOCUMENTS

| | | |
|---|---|---|
| 2014/0337621 A1 | 11/2014 | Nakhimov |
| 2015/0112995 A1* | 4/2015 | Elyada ................. G06F 16/9535 |
| | | 707/738 |
| 2015/0154520 A1 | 6/2015 | Federgreen et al. |
| 2015/0339673 A1 | 11/2015 | Adjaoute |
| 2016/0012235 A1 | 1/2016 | Lee et al. |
| 2016/0080397 A1 | 3/2016 | Bacastow et al. |
| 2016/0373262 A1 | 12/2016 | Shearer et al. |
| 2016/0373419 A1 | 12/2016 | Weigold et al. |
| 2017/0060949 A1* | 3/2017 | Li ..................... G06F 16/24542 |
| 2017/0099312 A1 | 4/2017 | Ganame et al. |
| 2017/0302665 A1 | 10/2017 | Zou et al. |
| 2017/0329942 A1 | 11/2017 | Choi |
| 2018/0007087 A1* | 1/2018 | Grady ................. H04L 63/1408 |
| 2018/0150647 A1* | 5/2018 | Naqvi ................... G06F 21/602 |
| 2018/0159882 A1 | 6/2018 | Brill et al. |
| 2018/0173886 A1* | 6/2018 | Dryer ................... H04L 63/105 |
| 2018/0309775 A1 | 10/2018 | Zou et al. |
| 2018/0373757 A1* | 12/2018 | Schukovets ........... G06F 16/221 |
| 2019/0050595 A1 | 2/2019 | Barday et al. |
| 2019/0147390 A1 | 5/2019 | Subramanian et al. |
| 2019/0163916 A1 | 5/2019 | Steele et al. |
| 2019/0166152 A1 | 5/2019 | Steele et al. |
| 2019/0228186 A1 | 7/2019 | Atreya et al. |
| 2019/0258823 A1 | 8/2019 | Barday et al. |
| 2019/0260787 A1 | 8/2019 | Zou |
| 2019/0260795 A1 | 8/2019 | Araiza et al. |
| 2019/0266529 A1 | 8/2019 | Barday et al. |

* cited by examiner

SECURITY TOOL FOR PREVENTING INTERNAL DATA BREACHES

TECHNICAL FIELD

This disclosure relates generally to protecting against data breaches.

BACKGROUND

Data breaches conventionally occur when malicious users access data without authorization.

SUMMARY OF THE DISCLOSURE

Data breaches conventionally occur when malicious users access data without authorization. During a data breach, a malicious user may access a business or organization's network and take the information of other users so that the malicious user can impersonate these users. Because data breaches pose great risk to customers and clients, businesses and organizations may spend substantial resources in combating and preventing data breaches.

One type of data breach that is difficult to detect and prevent is known as an internal data breach. During an internal data breach, a malicious user that is internal to the business or organization takes information from the business or organization. These types of data breaches are difficult to detect and prevent because the malicious user typically is authorized to access the information that is being taken. In some instances, a group of users may be involved in taking information. For example, a malicious user may be authorized to access the birthdays of customers, but not the social security numbers of customers. The malicious user may ask a coworker who is authorized to access customers' social security numbers for the customers' social security numbers. Believing the malicious user to be a friend or colleague, the coworker may access the customers' social security numbers and provide them to the malicious user. The malicious user may then use the customers' birthdays and social security numbers to impersonate the customers. It may be difficult to detect and prevent this example data breach because both the malicious user and the coworker access information that they are authorized to access.

This disclosure contemplates a security tool that detects and prevents internal data breaches in certain embodiments. Generally, the security tool analyzes database queries of internal users to determine if these users accessed information in a manner that deviates from established and/or expected access patterns. The security tool can also analyze the behavior of a group of internal users to determine whether that behavior deviates from expected access patterns. The security tool then determines security risks corresponding to the users' access. If any of the security risks exceeds a threshold, then the security tool takes remedial action (e.g., preventing one or more users from accessing information). In this manner, internal data breaches can be detected and prevented. Additionally, in certain embodiments, an internal data breach can be prevented before the internal data breach even occurs.

According to an embodiment, an apparatus includes a memory and a hardware processor. The memory stores a plurality of clusters. Each cluster of the plurality of clusters corresponding to an access pattern for a database. The processor decomposes a plurality of queries issued against the database by a plurality of users to determine a first set of queries issued by a first user of the plurality of users and a second set of queries issued by a second user of the plurality of users. The processor determines, from the first set of queries, a first set of columns in the database accessed by the first user as a result of issuing the first set of queries and determines, from the second set of queries, a second set of columns in the database accessed by the second user as a result of issuing the second set of queries. The processor also assigns, based at least in part on the first set of columns, the first user to a cluster of the plurality of clusters and assigns, based at least in part on the second set of columns, the second user to the cluster of the plurality of clusters. The processor further determines, based at least in part on the assignment of the first and second users to the cluster, that a first security risk corresponding to the first user accessing the first set of columns is below a threshold, determine, based at least in part on the assignment of the first and second users to the cluster, that a second security risk corresponding to the second user accessing the second set of columns is below the threshold, and determines, based at least in part on the assignment of the first and second users to the cluster, that a third security risk corresponding to the first user accessing the first set of columns and the second user accessing the second set of columns exceeds the threshold. In response to determining that the third risk exceeds the threshold, the processor prevents the first user from accessing the first set of columns and the second user from accessing the second set of columns.

According to another embodiment, a method includes storing, by a memory, a plurality of clusters. Each cluster of the plurality of clusters corresponding to an access pattern for a database. The method also includes decomposing, by a hardware processor communicatively coupled to the memory, a plurality of queries issued against the database by a plurality of users to determine a first set of queries issued by a first user of the plurality of users and a second set of queries issued by a second user of the plurality of users. The method further includes determining, by the processor, from the first set of queries, a first set of columns in the database accessed by the first user as a result of issuing the first set of queries and determining, by the processor, from the second set of queries, a second set of columns in the database accessed by the second user as a result of issuing the second set of queries. The method also includes assigning, by the processor, based at least in part on the first set of columns, the first user to a cluster of the plurality of clusters and assigning, by the processor, based at least in part on the second set of columns, the second user to the cluster of the plurality of clusters. The method further includes determining, by the processor, based at least in part on the assignment of the first and second users to the cluster, that a first security risk corresponding to the first user accessing the first set of columns is below a threshold, determining, by the processor, based at least in part on the assignment of the first and second users to the cluster, that a second security risk corresponding to the second user accessing the second set of columns is below the threshold, and determining, by the processor, based at least in part on the assignment of the first and second users to the cluster, that a third security risk corresponding to the first user accessing the first set of columns and the second user accessing the second set of columns exceeds the threshold. The method also includes, in response to determining that the third risk exceeds the threshold, preventing, by the processor, the first user from accessing the first set of columns and the second user from accessing the second set of columns.

According to yet another embodiment, a system includes a database and a security tool. The database stores a plurality of columns that form a plurality of tables. The security tool stores a plurality of clusters. Each cluster of the plurality of clusters corresponding to an access pattern for the database. The security tool also decomposes a plurality of queries issued against the database by a plurality of users to determine a first set of queries issued by a first user of the plurality of users and a second set of queries issued by a second user of the plurality of users. The security tool further determines, from the first set of queries, a first set of columns of the plurality of columns in the database accessed by the first user as a result of issuing the first set of queries and determines, from the second set of queries, a second set of columns of the plurality of columns in the database accessed by the second user as a result of issuing the second set of queries. The security tool also assigns, based at least in part on the first set of columns, the first user to a cluster of the plurality of clusters and assigns, based at least in part on the second set of columns, the second user to the cluster of the plurality of clusters. The security tool further determines, based at least in part on the assignment of the first and second users to the cluster, that a first security risk corresponding to the first user accessing the first set of columns is below a threshold, determines, based at least in part on the assignment of the first and second users to the cluster, that a second security risk corresponding to the second user accessing the second set of columns is below the threshold, and determines, based at least in part on the assignment of the first and second users to the cluster, that a third security risk corresponding to the first user accessing the first set of columns and the second user accessing the second set of columns exceeds the threshold. The security tool also, in response to determining that the third risk exceeds the threshold, prevents the first user from accessing the first set of columns and the second user from accessing the second set of columns.

Certain embodiments provide one or more technical advantages. For example, an embodiment detects and prevents internal data breaches by analyzing the access patterns of internal users and determining when these access patterns deviate from established or expected access patterns. As another example, an embodiment identifies risks arising from the access patterns of a group of internal users in determining whether the group of users pose a risk of an internal data breach. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
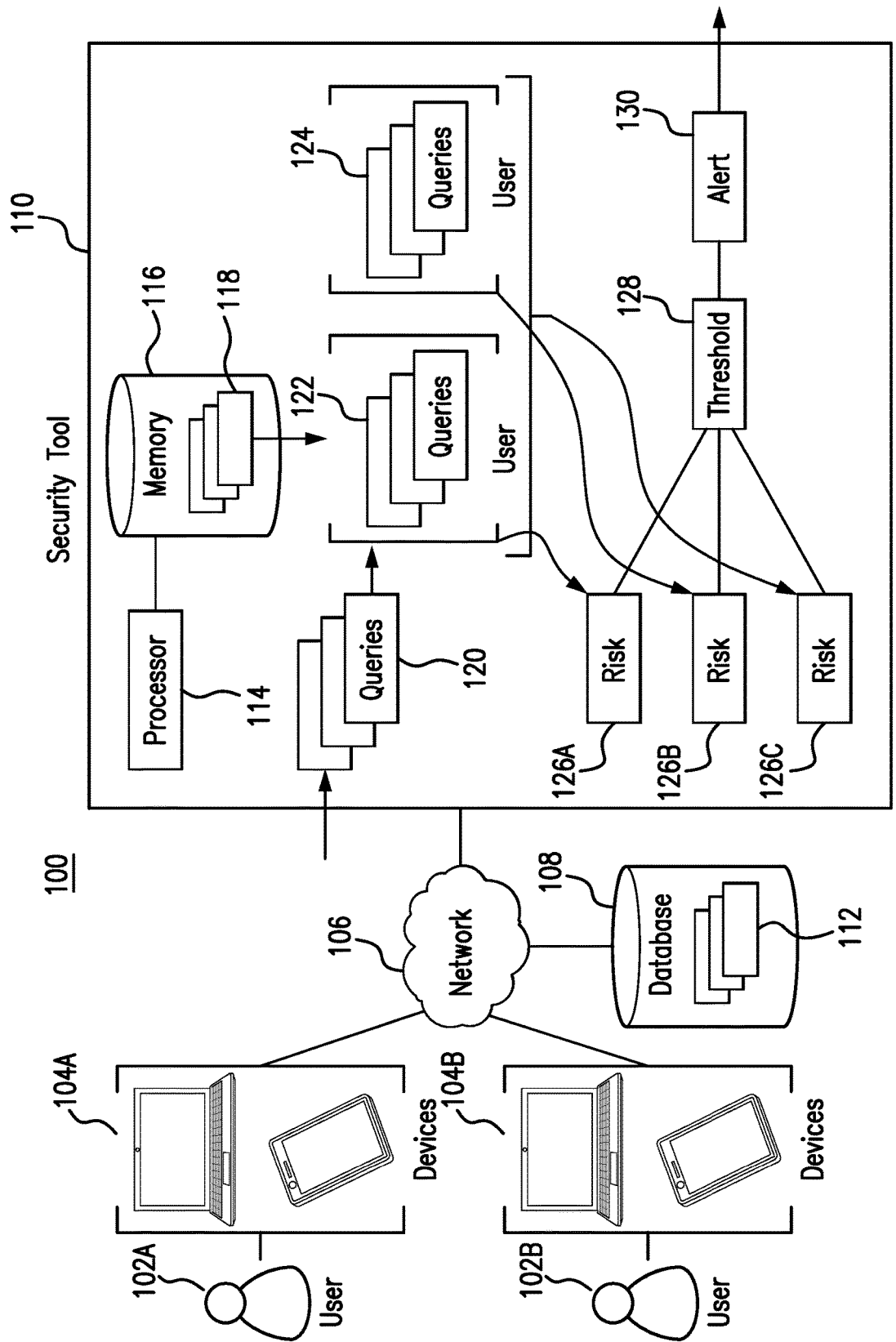
FIG. 1 illustrates an example system.
Figure 2:
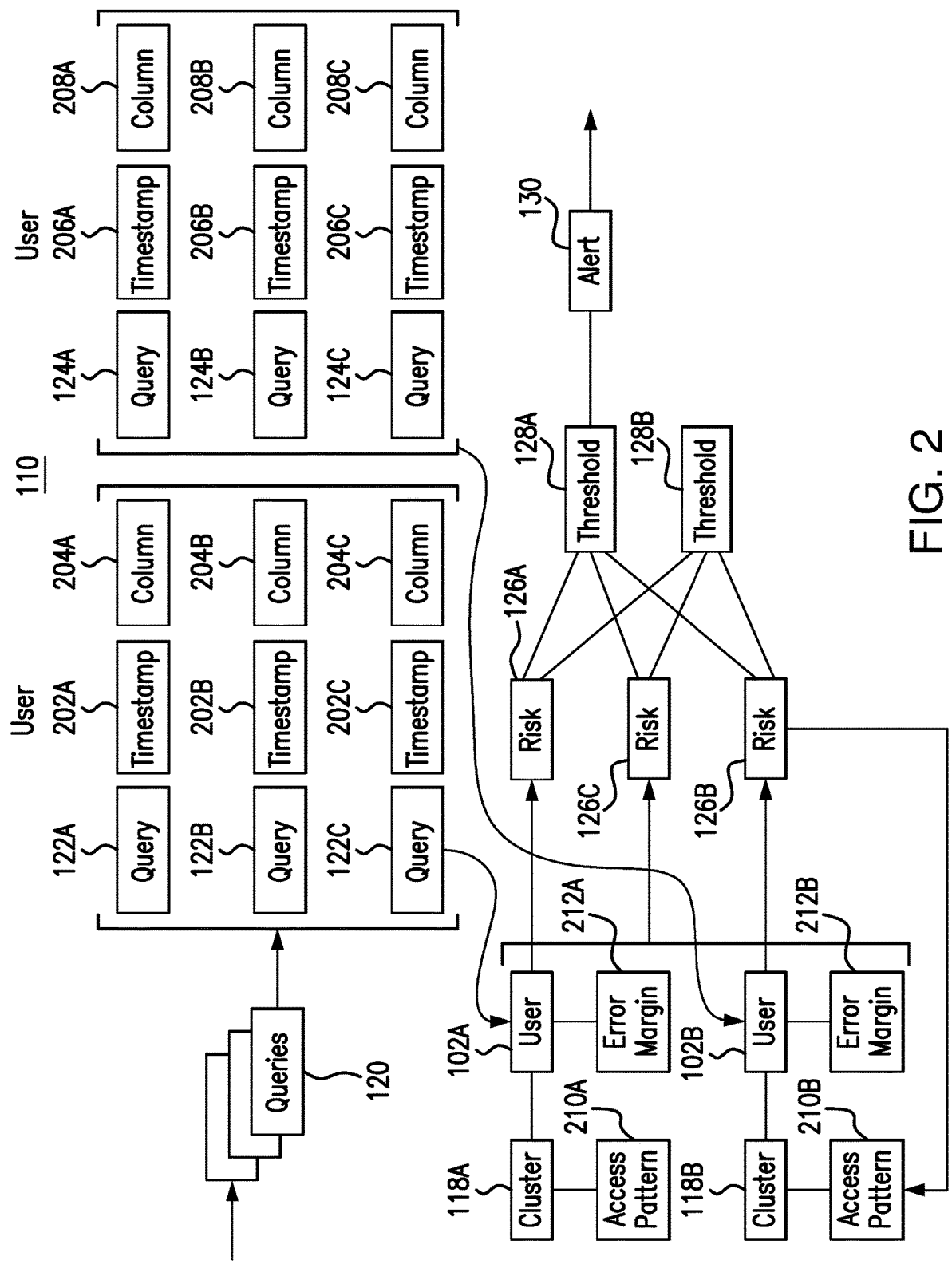
FIG. 2 illustrates an example security tool of the system of FIG. 1.
Figure 3:
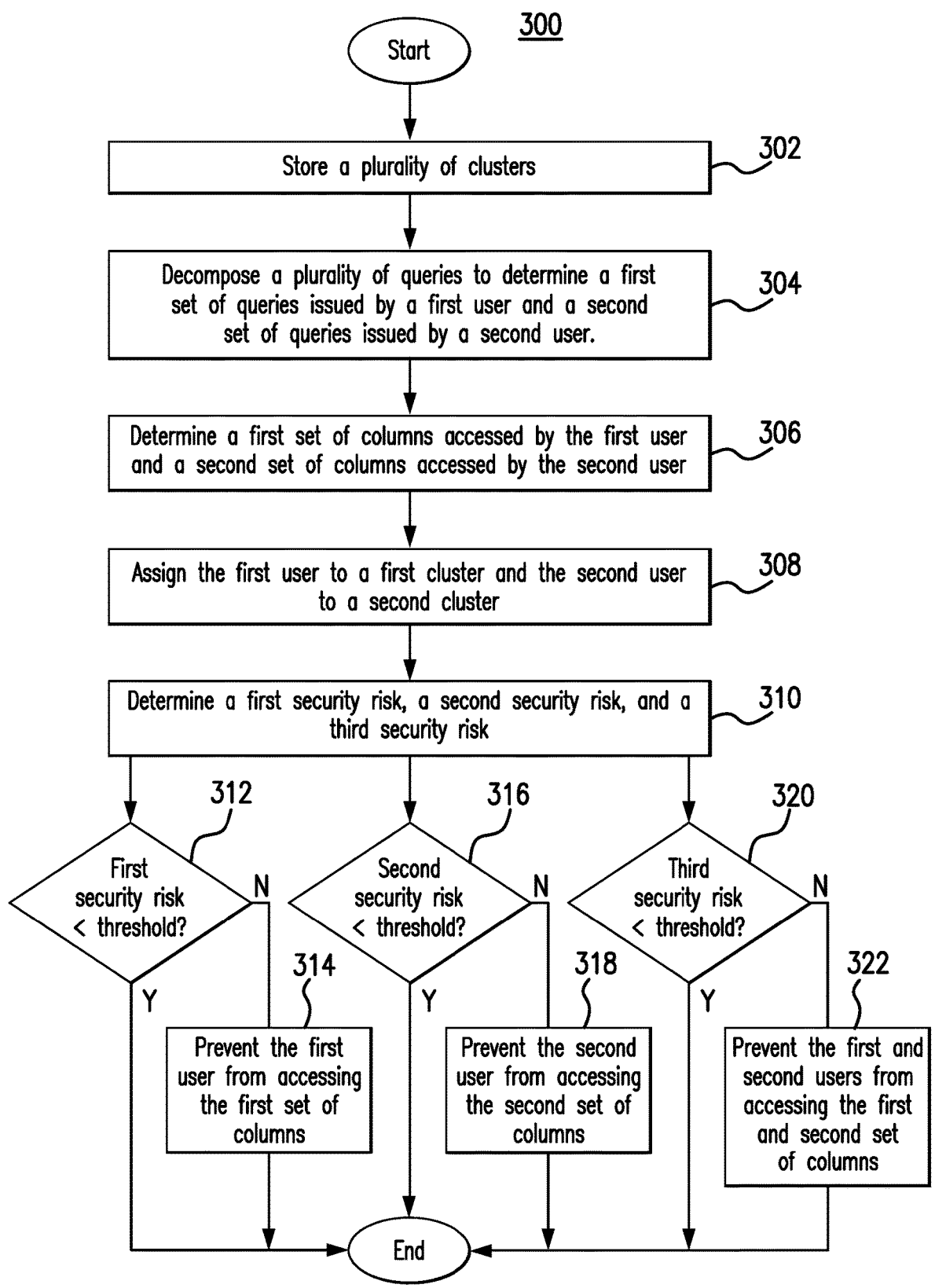
FIG. 3 is a flowchart illustrating a method for detecting and/or preventing an internal data breach using the system of FIG. 1.

Embodiments of the present disclosure and its advantages are best understood by referring to FIGS. 1 through 3 of the drawings, like numerals being used for like and corresponding parts of the various drawings.

Data breaches conventionally occur when malicious users access data without authorization. During a data breach, a malicious user may access a business or organization's network and take the information of other users so that the malicious user can impersonate these users. Because data breaches pose great risk to customers and clients, businesses and organizations may spend substantial resources in combating and preventing data breaches.

One type of data breach that is difficult to detect and prevent is known as an internal data breach. During an internal data breach, a malicious user that is internal to the business or organization takes information from the business or organization. These types of data breaches are difficult to detect and prevent because the malicious user typically is authorized to access the information that is being taken. In some instances, a group of users may be involved in taking information. For example, a malicious user may be authorized to access the birthdays of customers, but not the social security numbers of customers. The malicious user may ask a coworker who is authorized to access customers' social security numbers for the customers' social security numbers. Believing the malicious user to be a friend or colleague, the coworker may access the customers' social security numbers and provide them to the malicious user. The malicious user may then use the customers' birthdays and social security numbers to impersonate the customers. It may be difficult to detect and prevent this example data breach because both the malicious user and the coworker access information that they are authorized to access.

This disclosure contemplates a security tool that detects and prevents internal data breaches in certain embodiments. Generally, the security tool analyzes database queries of internal users to determine if these users accessed information in a manner that deviates from established and/or expected access patterns. The security tool can also analyze the behavior of a group of internal users to determine whether that behavior deviates from expected access patterns. The security tool then determines security risks corresponding to the users' access. If any of the security risks exceeds a threshold, then the security tool takes remedial action (e.g., preventing one or more users from accessing information). In this manner, internal data breaches can be detected and prevented. Additionally, in certain embodiments, an internal data breach can be prevented before the internal data breach even occurs. The security tool will be described in more detail using FIGS. 1 through 3.

FIG. 1 illustrates an example system 100 for detecting and/or preventing internal data breaches. Generally, system 100 analyzes database queries from multiple users to determine the risk that combinations of queries from combinations of users could result in an internal data breach. In this manner, system 100 can proactively detect and prevent internal data breaches at the point of user access in certain embodiments. As seen in FIG. 1 system 100 includes one or more devices 104, a network 106, a database 108, and a security tool 110.

Users 102 use devices 104 to interact with other components of system 100. For example, users 102 may use devices 104 to issue queries against database 108. User 102 may receive data from database 108 in response to issuing queries against database 108. System 100 includes any number of users 102 and any number of devices 104. In the example of FIG. 1, system 100 includes a user 102A using devices 104A and a user 102B using devices 104B. Each user 102A or 102B may issue queries against database 108 using devices 104A or 104B. The queries will result in information from database 108 being returned to devices 104A or 104B.

Users 102A and 102B may be part of the same organization or enterprise. Users 102A and 102B may be part of different teams or units within the enterprise, and thus, users 102A and 102B may be authorized to access different information within database 108. User 102B may be a malicious user who wants to use information in database 108 to impersonate customers or clients of the enterprise. User 102B, however, may not be authorized to access certain pieces of information in database 108 that would allow user 102B to impersonate these customers or clients. User 102A may be authorized to access information that when combined with the information that user 102B is authorized to access may be used by a malicious user to impersonate customers and/or clients. User 102B may befriend user 102A and ask user 102A for certain information from database 108 that user 102A is authorized to access. Believing that user's 102B request is innocuous, user 102A may access the information within database 108 and tell that information to user 102B. User 102B may then use the information provided by user 102A with the information that user 102B is authorized to access within database 108 to impersonate customers or clients of the enterprise. This form of data breach is referred to as an internal data breach. It may be difficult to detect and/or prevent internal data breaches because users 102A and 102B are accessing information that they are authorized to access.

Devices 104 include any appropriate device for communicating with components of system 100 over network 106. For example, devices 104 may be a telephone, a mobile phone, a computer, a laptop, a tablet, an automated assistant, and/or a cash register. This disclosure contemplates device 104 being any appropriate device for sending and receiving communications over network 106. As an example and not by way of limitation, device 104 may be a computer, a laptop, a wireless or cellular telephone, an electronic notebook, a personal digital assistant, a tablet, or any other device capable of receiving, processing, storing, and/or communicating information with other components of system 100. Device 104 may also include a user interface, such as a display, a microphone, keypad, or other appropriate terminal equipment usable by user 102. In some embodiments, an application executed by device 104 may perform the functions described herein.

Network 106 allows communication between and amongst the various components of system 100. For example, user 102 may use devices 104 to communicate over network 106. This disclosure contemplates network 106 being any suitable network operable to facilitate communication between the components of system 100. Network 106 may include any interconnecting system capable of transmitting audio, video, signals, data, messages, or any combination of the preceding. Network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 108 stores information that can be used by users 102A and 102B. The information may include personally identifiable information of customers and/or clients of the enterprise or organization. Database 108 stores information in tables 112. Tables 112 may include rows and columns of information. Users 102A and 102B may access particular tables 112 of database 108 to retrieve information from certain rows and/or columns of tables 112. Database 108 may receive queries from users 102A and 102B. In response, database 108 may retrieve information requested within those queries and communicate that information to users 102A and 102B. Database 108 is any suitable device for storing information. Database 108 may be a separate component of system 100 or a component that is integrated into other components of system 100 such as security tool 110. For example database 108 may be part of a database server or storage integrated into security tool 110.

Security tool 110 analyzes queries of users 102A and 102B to detect and/or prevent internal data breaches. As seen in FIG. 1, security tool 110 includes a processor 114 and a memory 116. This disclosure contemplates processor 114 and memory 116 being configured to perform any of the functions of security tool 110 described herein.

Processor 114 is any electronic circuitry, including, but not limited to microprocessors, application specific integrated circuits (ASIC), application specific instruction set processor (ASIP), and/or state machines, that communicatively couples to memory 116 and controls the operation of error repair tool 108. Processor 114 may be 8-bit, 16-bit, 32-bit, 64-bit or of any other suitable architecture. Processor 114 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 114 may include other hardware that operates software to control and process information. Processor 114 executes software stored on memory to perform any of the functions described herein. Processor 114 controls the operation and administration of security tool 110 by processing information received from devices 104, network 106, and memory 116. Processor 114 may be a programmable logic device, a microcontroller, a microprocessor, any suitable processing device, or any suitable combination of the preceding. Processor 114 is not limited to a single processing device and may encompass multiple processing devices.

Memory 116 may store, either permanently or temporarily, data, operational software, or other information for processor 114. Memory 116 may include any one or a combination of volatile or non-volatile local or remote devices suitable for storing information. For example, memory 116 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 116, a disk, a CD, or a flash drive. In particular embodiments, the software may include an application executable by processor 114 to perform one or more of the functions described herein.

Security tool 110 stores clusters 118. Each cluster 118 indicates an access pattern for database 108. The access pattern may include the information requested from database 108 and/or a time of the request. Each access pattern may include one or more tables 112 and/or rows and columns of table 112 accessed at particular times. These access patterns may act as centroids for each cluster 118. Security tool 110 may refer to these access patterns to cluster the data accesses by users 102A and 102B. By clustering the data accesses, security tool 110 can quickly analyze a potentially large dataset of accesses to determine the risk of an internal data breach. In certain embodiments, the access patterns indicated by clusters 118 may be expected or approved access patterns or access patterns indicative of a data breach. Users 102 can be clustered to a cluster 118 that indicates an expected or approved access pattern or a cluster 118 that indicates a risk of a data breach.

Security tool 110 receives one or more queries 120. Queries 120 may be the queries that users 102A and 102B have issued against database 108. Queries 120 may be communicated to security tool 110 when issued by users 102A and 102B. Security tool 110 may analyze queries 120 to determine the risk of an internal data breach and to respond accordingly. Security tool 110 analyzes queries 120 to determine the queries 120 that were issued by each user 102A and 102B. For example, security tool 110 may parse queries 120 to determine one or more characteristics of each query 120 such as an identity of a user 102 who issued the query 120, the information requested through the query 120, and a time when the query 120 was issued. In the example of FIG. 1, security tool 110 analyzes queries 120 to determine a set of queries 122 issued by user 102A and a set of queries 124 issued by user 102B. Each of queries 122 and 124 may request particular information from database 108. Each query 122 and 124 may further indicate the time when the query 122 or 124 was issued by user 102A or 102B. Security tool 110 may analyze the characteristics of queries 122 and 124 to determine the risk of an internal data breach. For example, security tool 110 may cluster users 102A and 102B and/or queries 122 and 124 using clusters 118 to determine whether users 102A and 102B have performed an access pattern that is expected or approved or an access pattern that is indicative of an internal data breach.

Security tool 110 determines one or more risks 126 that queries 122 and 124 are indicative of a data breach. In the example of FIG. 1, security tool 110 determines risk 126A based on queries 122. Risk 126A indicates the likelihood that user 102A is causing an internal data breach based solely on the queries 122 issued by user 102A. Security tool 110 may also determine risk 126B based on queries 124. Risk 126B may indicate the likelihood that user 102B is causing an internal data breach based solely on queries 124 issued by user 102B. Security tool 110 may also determine risk 126C based on queries 122 and 124. Risk 126C may indicate the likelihood that users 102A and 102B are causing an internal data breach based on the queries 122 and 124. Thus, risk 126C considers the access patterns of both users 102A and 102B to assess whether an internal data breach is likely occurring.

Security tool 110 compares risks 126A, 126B, and 126C to threshold 128. If one or more of risks 126A, 126B, and 126C exceed threshold 128, security tool 110 may determine that an internal data breach is likely occurring. Security tool 110 may determine any number of risks 126 for any number of users 102 and any number of queries 120. Security tool 110 may compare any number of risks 126 against threshold 128. Threshold 128 may be adjusted based on past determinations of internal data breaches. For example, security tool 110 may adjust threshold 128 to more accurately determine when a risk 126 is too high, and thus indicates a likelihood of an internal data breach. Security tool 110 may increase threshold 128 when too many false positives have been previously determined. Conversely, security tool 110 may decrease threshold 128 when too many false negatives have been previously determined.

If security tool 110 determines that one or more risks 126 exceed threshold 128, security tool 110 may determine that an internal data breach is likely occurring. Security tool 110 may then take remedial action. For example, if risk 126A exceeds threshold 128, security tool 110 may prevent user 102A from accessing the information in database 108 requested by queries 122. If risk 126B exceeds threshold 128, security tool 110 may prevent user 102B from accessing the information within database 108 requested by queries 124. If risk 126C exceeds threshold 128, security tool 110 may prevent both users 102A and 102B from accessing the information in database 108 requested by queries 122 and 124. In this manner, security tool 110 may prevent an internal data breach from occurring.

In certain embodiments, security tool 110 generates and communicates an alert 130 indicating a likely internal data breach when security tool 110 determines that one or more risks 126 exceed threshold 128. Security tool 110 may communicate alert 130 to an administrator who can evaluate the risks 126 and determine how to address one or more users 102A and 102B.

In the example of FIG. 1, user 102B may be a malicious user, but user 102B may not be able to impersonate customers and/or clients using only the information that user 102B is authorized to access in database 108. User 102B may also need the information that user 102A is authorized to access to impersonate the customers and/or clients. User 102B may befriend user 102A and ask user 102A for the information that user 102A is authorized to access in database 108. Believing the request to be innocuous, user 102A may access database 108 to reach the requested information. User 102A may communicate one or more queries 122 to database 108 requesting the information desired by user 102B. User 102B may also communicate one or more queries 124 to retrieve the information that user 102B is authorized to access. If users 102A and 102B were allowed to access this information, then the information may be used to impersonate customers or clients. Security tool 110 may analyze queries 122 and 124 to determine the likelihood that an internal data breach is occurring.

Security tool 110 may receive queries 120 from users 102A and 102B. Security tool 110 may parse these queries 120 to determine the queries 122 issued by user 102A and the queries 124 issued by user 102B. Security tool 110 may then cluster the access patterns of users 102A and 102B based on the clusters 118. Security tool 110 may cluster users 102A and 102B to the same cluster 118 or two different clusters 118. Security tool 110 may analyze these clusters 118 to determine the risks 126 corresponding to the access patterns of users 102A and 102B. Security tool 110 may determine that the individual access patterns of users 102A and 102B do not present a risk of an internal data breach. This may be because both users 102A and 102B are accessing information that they are authorized to access in database 108. As a result, security tool 110 may determine that risks 126A and 126B do not exceed threshold 128. However, when security tool 110 analyzes risk 126C based on the clustering of user 102A and 102B together within clusters 118, security tool 110 may determine that the risk 126C of an internal data breach exceeds threshold 128. Risk 126C may exceed threshold 128 because the combination of the information accessed by users 102A and 102B may be used to impersonate customers and/or clients. Security tool 110 may determine that the combination of this information and the timing of queries 122 and 124 results in a high likelihood of an internal data breach. In response, security tool 110 may prevent users 102A and 102B from accessing the requested information in database 108. As a result, security tool 110 may prevent an internal data breach.

FIG. 2 illustrates an example security tool 110 of the system 100 of FIG. 1. Generally, security tool 110 detects and prevents internal data breaches by analyzing the queries 120 issued by users 102A and 102B of an organization or enterprise. In particular embodiments, security tool 110 improves the security of customer and/or client information held by the organization or enterprise by detecting and preventing an internal data breach that would compromise that information.

Security tool 110 receives one or more queries 120. Each query 120 may have been issued by a user 102A or 102B of the organization or enterprise. Each query 120 requests particular information from a database 108 of the organization or enterprise. Although each user 102 may be requesting information that the user 102 is authorized to access, the combination of the timing of the queries and the totality of the information requested by the queries 120 may indicate that an internal data breach is likely to occur. For example, users 102 may be requesting information that when combined may allow a malicious user to impersonate a customer or client of the enterprise or organization. Additionally, the users 102 may be requesting information at times when those users 102 do not typically request such information. The totality of the circumstances may cause security tool 110 to determine that the risk of an internal data breach is high and to take remedial action.

Security tool 110 analyzes the received queries 120 to determine the queries 120 issued by each user 102. Security tool 110 may intercept these queries 120 before they are issued against database 118. In certain embodiments, security tool 110 may parse each query 120 to determine various characteristics of a query 120. In the example of FIG. 2, security tool 110 parses query 120 to determine three queries 122 issued by a user 102A. Security tool 110 determines that user 102A has issued queries 122A, 122B, and 122C. Additionally, security tool 110 determines timestamps 202 for each query 122. For example, security tool 110 determines that query 122Aa was issued at a time represented by timestamp 202A, query 122B was issued at a time represented by timestamp 202B, and query 122C was issued at a time represented by timestamp 202C. Furthermore, security tool 110 determines columns 204 of tables 112 and database 108 accessed by each query 122. For example, security tool 110 determines that query 122A accesses columns 204A, query 122B accessing columns 204B, and query 122C accesses columns 204C.

Security tool 110 parses queries 120 to determine queries 124 issued by another user 102B. In the example of FIG. 2, security tool 110 determines that user 102B issued queries 124A, 124B, and 124C. Security tool 110 also determines the times at which these queries 124 were issued. For example, security tool 110 determines that query 124A was issued at a time represented by timestamp 206A, query 124B was issued at a time represented by timestamp 206B, and query 124C was issued at a time represented by timestamp 206C. Furthermore, security tool 110 determines the columns 208 of tables 112 of database 108 accessed by the queries 124. For example, security tool 110 determines that query 124A accesses columns 208A, query 124B accesses columns 208C, and query 124C accesses columns 208C. In this manner, security tool 110 determines the individual queries 122 and 124 issued by each user 102A and 102B.

Security tool 110 then clusters each user 102 based on the characteristics of the queries 122 and 124 issued by each user 102. Security tool 110 may use the columns 204 and 208 and the timestamps 202 and 206 to cluster each user 102 to a particular access pattern 210 of a cluster 118. In the example of FIG. 2, security tool 110 clusters user 102A to cluster 118A based on queries 122, timestamps 202, and columns 204. For example, security tool 110 may determine that queries 122, timestamps 202, and columns 204 establish a particular access pattern for user 102A. Security tool 110 may determine that this access pattern is closest to access pattern 210A corresponding to cluster 118A. As a result, security tool 110 clusters user 102A to cluster 118A. Likewise, security tool 110 clusters user 102B to cluster 118B based on queries 124, timestamps 206, and columns 208. Security tool 110 may determine that queries 124, timestamps 206, and columns 208 indicate a particular access pattern of user 102B. Security tool 110 may determine that this access patterns is closest to access pattern 210B corresponding to cluster 118B. As a result, security tool 110 clusters user 102B to cluster to 118B. In particular embodiments, security tool 110 may cluster users 102A and 102B to the same cluster from 118. In other words, in the example of FIG. 2, cluster 118A and cluster 118B may be the same cluster 118, and access pattern 210A and access pattern 210B may be the same access pattern 210.

By clustering users 102A and 102B to particular clusters 118A and 118B, security tool 110 may analyze the access patterns of users 102A and 102B to determine whether these access patterns more closely align with expected or authorized access patterns 210 or whether these access patterns more closely align with access patterns 210 that indicate an internal data breach. If the access patterns of users 102A and 102B more closely align with access patterns 210 that indicate an internal data breach, security tool 110 may take remedial action.

In certain embodiments, security tool 110 applies an error margin 212 in clustering users 102A and 102B to clusters 118. Security tool 110 may apply error margin 212A to the access pattern of user 102A and an error margin 212B to the access pattern user 102B. The error margins 212 may allow for some leeway in determining whether the access pattern of a user 102 is indicative of an internal data breach. For example, these error margins 212 may be applied to establish a margin around the centroids of clusters 118. If the access pattern of the user 102 falls within this margin, then the user 102 may be clustered within that cluster 118. Security tool 110 may apply these error margins 212 to the risks 126 calculated based on the access patterns of a particular user 102 and/or the cluster 118 for a user 102. The error margin 212 may be added or subtracted to the calculated risks 126 to provide leeway in determining whether the user's 102 access pattern is indicative of an internal data breach.

In some embodiments, security tool 110 updates the error margins 212 based on whether the calculated risks 126 exceed thresholds 128. For example, if a particular risk 126 exceeds the threshold 128 (indicating a likely a data breach), but it turns out that no data breach occurred, then security tool 110 may increase the error margin 212 for that user 102 so that future incidences of false positives may be reduced. Conversely, if a risk 126 is lower than a threshold 128 (indicating that no data breach is likely occurring) but it is determined that a data breach is indeed occurring, then security tool 110 may decrease the error margin 212 for that user 102 so that future false negatives are reduced.

Security tool 110 determines risks 126 for the access patterns of one or more users 102. Each risk 126 indicates a likelihood that an internal data breach is occurring. In the example of FIG. 2, security tool 110 determines a risk 126A based on user 102A being clustered to cluster 118A. Security tool 110 also determines a risk 126B for user 102B being assigned to cluster 118B. Security tool 110 also determines a risk 126C based on user 102A being assigned to cluster 118A and user 102B being assigned to cluster 118B. As a result, risk 126A indicates a likelihood that a data breach is occurring based solely on the access pattern of user 102A, risk 126B indicates the likelihood of a data breach based solely on the access pattern of user 102B, and risk 126C indicates the likelihood of a data breach based on the combined access patterns of users 102A and 102B.

Security tool 110 then evaluates these risks 126A, 126B, and 126C to determine whether an internal data breach is likely occurring. Security tool 110 compares each risk 126A, 126B, 126C, to a threshold 128A to determine whether an internal data breach is likely occurring. If one or more of these risks 126A, 126B, or 126C exceeds threshold 128A, security tool 110 may determine that an internal data breach is occurring and take remedial action. For example, security tool 110 may prevent one or more users 102A and 102B from accessing the information requested by that user 102A and 102B. As another example, security tool 110 may generate and communicate an alert 130 indicating the likely internal data breach to a system administrator to warn the administrator of the data breach.

In certain embodiments, security tool 110 may compare each risk 126A, 126B, and 126C to a second threshold 128B to determine whether access patterns 210 and error margins 212 should be updated. The threshold 128B may be set significantly higher or lower than threshold 128A. Thus, if risks 126A, 126B, and 126C exceed or fall below threshold 128B, then certain adjustments should be made to access patterns 210 and/or error margins 212 to better tune security tool 110 to determine data breaches in the future. For example, security tool 110 may adjust access patterns 210A and/or 210B based on the comparison of risks 126A, 126B, and 126C to threshold 128b. Security tool 110 may add particular access times and/or access information to access patterns 210A and 210B to adjust access patterns 210A and 210B. As another example, security tool 110 may increase or decrease error margins 212 based on the comparison of risks 126A, 126B, and 126C to threshold 128B.

As an example, security tool 110 may assign users 102A and 102B to clusters 118A and 118B based on the timing of the queries 120. Using the example of FIG. 2, security tool 110 may determine that user 102A issued queries 122A, 122B, and 122C before user 102B issued queries 124A, 124B, and 124C. Security tool 110 may make this determination based on timestamps 202A, 202B, 202C, 206A, 206B, and 206C. Security tool 110 may then determine the columns 204 requested by user 102A and the columns 208 requested by user 102B. As a result, security tool 110 has determined a particular access pattern in which user 102A requested columns 204A, 204B, and 204C before user 102B requested columns 208A, 208B, and 208C. Based on this determination, security tool 110 may assign user 102A to cluster 118A and user 102B to cluster 118B. The risks 126 based on this clustering my reveal that user 102A accessing columns 204A, 204B, and 204C before user 102B accesses columns 208A, 208B, and 208C aligns with an access pattern 210 that indicates an internal data breach. As a result, security tool 110 may prevent users 102A and 102B from accessing columns 204A, 204B, 204C, 208A, 208B, and 208C.

As another example, security tool 110 may determine that user 102A accessed column 204A before user 102A accessed columns 204B and 204C. Security tool 110 may make this determination based on timestamps 202A, 202B, and 202C. Based on this particular access pattern in which user 102A accesses columns 204A before columns 204B and 204C, security tool 110 may assign user 102A to cluster 118A. Based on this clustering, security tool 110 may determine that the risk 126A of a data breach occurring is high. As a result, security tool 110 may take remedial actions and prevent user 102A from accessing columns 204A, 204B, and 204C.

As yet another example, security tool 110 may determine that user 102A is accessing columns 204A, 204B, and 204C at a time when user 102A typically does not access these columns 204A, 204B, and 204C. Security tool 110 may also determine that user 102B is accessing columns 208A, 208B, and 208C at an unusual time. In response to these determinations, security tool 110 may determine that one or more of risks 126A, 126B, and 126C exceed threshold 128A. Security tool 110 may then prevent users 102A and 102B from accessing columns 204 and 208. In this manner, security tool 110 detects and prevents data breaches.

FIG. 3 is a flowchart illustrating a method 300 for detecting and/or preventing an internal data breach using the system 100 of FIG. 1. In particular embodiments, security tool 110 performs the steps of method 300. Generally, by performing the steps in method 300, security tool 110 detects and/or prevents internal data breaches.

Security tool 110 stores a plurality of clusters 118 in step 302. In step 304, security tool 110 decomposes a plurality of queries 120 to determine a first set of queries 122 issued by a first user 102A and a second set of queries 124 issued by a second user 102B. Security tool 110 then determines a first set of columns 204 accessed by the first user 102A and a second set of columns 208 accessed by the second user 102B. In step 308, security tool 110 assigns the first user 102A to a first cluster 118A and the second user 102B to a second cluster 118B. Security tool 110 then determines a first security risk 126A, a second security risk 126B, and a third security risk 126C in step 310.

In step 312, security tool 110 determines whether the first security risk 126A is less than a threshold 128. If the first security risk 126A is less than the threshold 128, security tool 110 may determine that the access pattern of the first user 102A does not indicate a likelihood of internal data breach. If security tool 110 determines that the first security risk 126A exceeds the threshold 128, security tool 110 may prevent the first user 102A from accessing the first set of columns 204 in step 314.

In step 316, security tool 110 determines whether the second security risk 126B exceeds the threshold 128. If the second security risk 126B does not exceed the threshold 128, security tool 110 may determine that the access pattern of the second user 102B does not indicate a likelihood of an internal data breach. If security tool 110 determines that the second security risk 126B does exceed the threshold 128, security tool 110 prevents the second user 102B from accessing the second set of columns 208 in step 318.

In step 320, security tool 110 determines whether the third security risk 126C exceeds the threshold 128. If the third security risk 126C does not exceed the threshold 128, security tool 110 determines that the access patterns of the first user 102A and the second user 102B do not indicate a likelihood of an internal data breach. If security tool 110 determines that the third security risk 126C exceeds the threshold 128, security tool 110 prevents the first and second users 102A and 102B from accessing the first and second set of columns 204 and 208 in step 322. In this manner, security tool 110 determines and/or prevents internal data breaches in certain embodiments.

Modifications, additions, or omissions may be made to method 300 depicted in FIG. 3. Method 300 may include more, fewer, or other steps. For example, steps may be performed in parallel or in any suitable order. While discussed as security tool 110 performing the steps, any suitable component of system 100, such as device(s) 104 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a memory configured to store a plurality of clusters, each cluster of the plurality of clusters corresponding to an access pattern for a database; and
a hardware processor communicatively coupled to the memory, the hardware processor configured to:
decompose a plurality of queries issued against the database by a plurality of users to determine a first set of queries issued by a first user of the plurality of users and a second set of queries issued by a second user of the plurality of users;
determine, from the first set of queries, a first set of columns in the database accessed by the first user as a result of issuing the first set of queries;
determine, from the second set of queries, a second set of columns in the database accessed by the second user as a result of issuing the second set of queries;
assign, based at least in part on the first set of columns, the first user to a cluster of the plurality of clusters;
assign, based at least in part on the second set of columns, the second user to the cluster of the plurality of clusters;
determine, based at least in part on the assignment of the first and second users to the cluster, that a first security risk corresponding to the first user accessing the first set of columns is below a threshold;
determine, based at least in part on the assignment of the first and second users to the cluster, that a second security risk corresponding to the second user accessing the second set of columns is below the threshold;
determine, based at least in part on the assignment of the first and second users to the cluster, that a third security risk corresponding to the first user accessing the first set of columns and the second user accessing the second set of columns exceeds the threshold; and
in response to determining that the third risk exceeds the threshold, prevent the first user from accessing the first set of columns and the second user from accessing the second set of columns.

2. The apparatus of claim 1, wherein the hardware processor is further configured to:
determine a first set of times when the first user issued the first set of queries; and
determine a second set of times when the second user issued the second set of queries, the determination that the third security risk exceeds the threshold is further based on the first of times and the second set of times.

3. The apparatus of claim 1, wherein the hardware processor is further configured to update the plurality of access patterns based at least in part on the third security risk exceeding a second threshold.

4. The apparatus of claim 1, wherein the hardware processor is further configured to:
assign, to the first user, a first error margin, the determination whether the first security risk exceeds the first threshold is further based on the first error margin; and
update the first error margin based at least in part on the determination that the third security risk exceeds the threshold.

5. The apparatus of claim 1, wherein the hardware processor is further configured to communicate an alert to an administrator in response to the determination that the third security risk exceeds the threshold.

6. The apparatus of claim 1, wherein the hardware processor is further configured to determine that the first user accessed a first column of the first set of columns before the first user accessed a second column of the first set of columns, assigning the first user to the cluster is further based on the determination that the first user accessed the first column before the second column.

7. The apparatus of claim 1, wherein the hardware processor is further configured to determine that the first user accessed a first column of the first set of columns before the second user accessed a second column of the second set of columns, assigning the first user to the cluster and the second user to the cluster is further based on the determination that the first user accessed the first column before the second user accessed the second column.

8. A method comprising:
storing, by a memory, a plurality of clusters, each cluster of the plurality of clusters corresponding to an access pattern for a database;
decomposing, by a hardware processor communicatively coupled to the memory, a plurality of queries issued against the database by a plurality of users to determine a first set of queries issued by a first user of the plurality of users and a second set of queries issued by a second user of the plurality of users;
determining, by the processor, from the first set of queries, a first set of columns in the database accessed by the first user as a result of issuing the first set of queries;
determining, by the processor, from the second set of queries, a second set of columns in the database accessed by the second user as a result of issuing the second set of queries;
assigning, by the processor, based at least in part on the first set of columns, the first user to a cluster of the plurality of clusters;
assigning, by the processor, based at least in part on the second set of columns, the second user to the cluster of the plurality of clusters;
determining, by the processor, based at least in part on the assignment of the first and second users to the cluster, that a first security risk corresponding to the first user accessing the first set of columns is below a threshold;
determining, by the processor, based at least in part on the assignment of the first and second users to the cluster, that a second security risk corresponding to the second user accessing the second set of columns is below the threshold;

determining, by the processor, based at least in part on the assignment of the first and second users to the cluster, that a third security risk corresponding to the first user accessing the first set of columns and the second user accessing the second set of columns exceeds the threshold; and in response to determining that the third risk exceeds the threshold, preventing, by the processor, the first user from accessing the first set of columns and the second user from accessing the second set of columns.

9. The method of claim 8, further comprising:

determining, by the processor, a first set of times when the first user issued the first set of queries; and determining, by the processor, a second set of times when the second user issued the second set of queries, the determination that the third security risk exceeds the threshold is further based on the first of times and the second set of times.

10. The method of claim 8, further comprising updating, by the processor, the plurality of access patterns based at least in part on the third security risk exceeding a second threshold.

11. The method of claim 8, further comprising:

assigning, by the processor, to the first user, a first error margin, the determination whether the first security risk exceeds the first threshold is further based on the first error margin; and updating, by the processor, the first error margin based at least in part on the determination that the third security risk exceeds the threshold.

12. The method of claim 8, further comprising communicating, by the processor, an alert to an administrator in response to the determination that the third security risk exceeds the threshold.

13. The method of claim 8, further comprising determining, by the processor, that the first user accessed a first column of the first set of columns before the first user accessed a second column of the first set of columns, assigning the first user to the cluster is further based on the determination that the first user accessed the first column before the second column.

14. The method of claim 8, further comprising determining, by the processor, that the first user accessed a first column of the first set of columns before the second user accessed a second column of the second set of columns, assigning the first user to the cluster and the second user to the cluster is further based on the determination that the first user accessed the first column before the second user accessed the second column.

15. A system comprising:

a database configured to store a plurality of columns that form a plurality of tables; and a security tool configured to:

store a plurality of clusters, each cluster of the plurality of clusters corresponding to an access pattern for the database;

decompose a plurality of queries issued against the database by a plurality of users to determine a first set of queries issued by a first user of the plurality of users and a second set of queries issued by a second user of the plurality of users;

determine, from the first set of queries, a first set of columns of the plurality of columns in the database accessed by the first user as a result of issuing the first set of queries;

determine, from the second set of queries, a second set of columns of the plurality of columns in the database accessed by the second user as a result of issuing the second set of queries;

assign, based at least in part on the first set of columns, the first user to a cluster of the plurality of clusters;

assign, based at least in part on the second set of columns, the second user to the cluster of the plurality of clusters;

determine, based at least in part on the assignment of the first and second users to the cluster, that a first security risk corresponding to the first user accessing the first set of columns is below a threshold;

determine, based at least in part on the assignment of the first and second users to the cluster, that a second security risk corresponding to the second user accessing the second set of columns is below the threshold;

determine, based at least in part on the assignment of the first and second users to the cluster, that a third security risk corresponding to the first user accessing the first set of columns and the second user accessing the second set of columns exceeds the threshold; and in response to determining that the third risk exceeds the threshold, prevent the first user from accessing the first set of columns and the second user from accessing the second set of columns.

16. The system of claim 15, wherein the security tool is further configured to:

determine a first set of times when the first user issued the first set of queries; and determine a second set of times when the second user issued the second set of queries, the determination that the third security risk exceeds the threshold is further based on the first of times and the second set of times.

17. The system of claim 15, wherein the security tool is further configured to update the plurality of access patterns based at least in part on the third security risk exceeding a second threshold.

18. The system of claim 15, wherein the security tool is further configured to:

assign, to the first user, a first error margin, the determination whether the first security risk exceeds the first threshold is further based on the first error margin; and update the first error margin based at least in part on the determination that the third security risk exceeds the threshold.

19. The system of claim 15, wherein the security tool is further configured to determine that the first user accessed a first column of the first set of columns before the first user accessed a second column of the first set of columns, assigning the first user to the cluster is further based on the determination that the first user accessed the first column before the second column.

20. The system of claim 15, wherein the security tool is further configured to determine that the first user accessed a first column of the first set of columns before the second user accessed a second column of the second set of columns, assigning the first user to the cluster and the second user to the cluster is further based on the determination that the first user accessed the first column before the second user accessed the second column.

* * * * *